United States Patent [19]

Bryant et al.

[11] Patent Number: 4,767,481
[45] Date of Patent: Aug. 30, 1988

[54] PROCESS FOR MAKING A TIRE HAVING DECORATIVE APPLIQUE

[75] Inventors: Lynn A. Bryant, Canton; Thomas W. Bell, Mogadore, both of Ohio

[73] Assignee: The Firestone Tire & Rubber Company, Akron, Ohio

[21] Appl. No.: 766,227

[22] Filed: Aug. 16, 1985

[51] Int. Cl.[4] .............................................. B29B 17/00
[52] U.S. Cl. ...................................... 156/116; 156/240
[58] Field of Search ............... 156/116, 277, 230, 240; 152/524, DIG. 12; 428/914, 40, 42, 187, 202, 343, 356; 427/147, 152, 155

[56] References Cited

U.S. PATENT DOCUMENTS

| 1,552,907 | 9/1925 | Binmore | 156/230 X |
|---|---|---|---|
| 2,611,153 | 9/1952 | Semegen | 427/155 X |
| 2,646,379 | 7/1953 | Poschel | 156/240 X |
| 3,073,371 | 1/1963 | Leeper | 152/330 |
| 3,113,902 | 12/1963 | Dismuke | 156/416 |
| 3,114,650 | 12/1963 | Oppenheim et al. | 427/155 X |
| 3,280,427 | 10/1966 | Smith | 18/13 |
| 3,285,314 | 11/1966 | Roberts | 152/523 |
| 3,382,120 | 5/1968 | Rudder | 156/116 |
| 3,449,201 | 6/1969 | Palmquist et al. | 152/523 |
| 3,607,498 | 9/1971 | Kubota | 156/116 |
| 3,764,455 | 10/1973 | Lovell et al. | 161/162 |
| 3,865,663 | 2/1975 | Oka | 156/116 |
| 4,019,945 | 4/1977 | Look et al. | 156/116 X |
| 4,038,256 | 7/1977 | Finelli et al. | 260/75 NH |
| 4,072,645 | 2/1978 | Cogley, Jr. | 260/29.7 M |
| 4,170,503 | 10/1979 | Buchanan et al. | 152/523 X |
| 4,237,173 | 12/1980 | Kuan | 428/65 |
| 4,256,159 | 3/1981 | Williams | 152/523 |
| 4,259,227 | 3/1981 | Ojakaar | 156/116 X |
| 4,317,479 | 3/1982 | McDonald | 152/523 |
| 4,461,795 | 7/1984 | Ogawa | 156/116 |

FOREIGN PATENT DOCUMENTS

| 1078907 | 3/1960 | Fed. Rep. of Germany | 156/240 |
|---|---|---|---|
| 54-69190 | 6/1979 | Japan | 156/240 |
| 59-75808 | 4/1984 | Japan | 152/524 |
| 0867225 | 5/1961 | United Kingdom | 156/240 |

OTHER PUBLICATIONS

Rubber Technology and Manufacture, Newnes-Butterworths, London, 1971, pp. 106-110.

Primary Examiner—Robert A. Dawson
Assistant Examiner—Ramon Hoch
Attorney, Agent, or Firm—Daniel N. Hall

[57] ABSTRACT

A polymeric paint applique is transferred from a substrate to the sidewall of a tire during the curing process. Upon curing, the bond between the tire and the applique is significantly greater than that between the substrate and the applique. The substrate may remain intact with the applique bonded to the tire sidewall until the tire is put into use, serving as a protective layer for the applique.

4 Claims, 1 Drawing Sheet

PROCESS FOR MAKING A TIRE HAVING DECORATIVE APPLIQUE

TECHNICAL FIELD

The invention herein resides in the art of vehicle tires and, more particularly, to such tires having decorative appliques thereon such as continuous sidewall bands. The invention relates to a tire in which an applique is transferred to the tire during curing or vulcanization, and in which a standard tire carcass may be used for forming both black wall tires and those having decorative sidewalls. The invention comprises both the tire product and the process for making the same.

BACKGROUND OF THE INVENTION

Heretofore, tires having decorative sidewalls have been well known and well received in the marketplace. The decorative portion of sidewalls having a decorative band on the side of the tire have typically been formed by the coextrusion of black rubber along with colored or white rubber, the resulting extrudate being applied to the sidewall of the tire and vulcanized therewith during the curing process. This coextrusion process involves expensive materials, processing steps, and equipment. Further, the previously known process, while progressively improving, often results in blemishes, imperfections, voids, and the like in the sidewall area, greatly increasing waste during the manufacturing process.

It has also become popular to design tires having decorations such as words, letters, logos, and the like on the sidewall, the same being introduced to the tire through molding or extruding processes which are also time consuming and expensive. As with the tires having decorative bands, these tires have a characteristic waste factor associated therewith, significantly adding to the manufacturing costs. The expense of sophisticated molds and dies to achieve such "custom" tires has made such tires unavailable to the average member of the consuming public.

It is further known in the tire industry that different tire carcasses must be formed for black wall tires than those having decorative features on the sidewalls thereof. Heretofore, each has been constructed differently. Modern tires are designed with increasingly thinner sidewalls, such that the decorative portion of the sidewall is becoming an increasingly significant part of the tire construction itself. Since the decorative portion is typically not a good structural element, it is becoming increasingly difficult to manufacture modern tires having sidewalls with decorative features thereon. Previously known tires with decorative sidewalls have, of necessity, demonstrated an imbalance from side-to-side, and a significant modulus change over the decorative zone.

It is further presented that the construction of decorative sidewall tires has typically required the application of a protective paint or coating to the decorative area after construction is completed. This paint or coating protects the decorative area during shipping and handling, and is removed when the tire is installed on a vehicle. Again, this includes yet an additional step in the manufacturing process, which step necessarily increases the cost of the tire.

DISCLOSURE OF INVENTION

In light of the foregoing, it is a first aspect of the invention to provide a tire having a decorative applique and a process for making the same in which a black wall tire may be selectively employed.

Another aspect of the invention is the provision of a tire having a decorative applique and the process for making the same in which such process is a simple one, eliminating the steps and material previously used for coextruding a sidewall band or decorative material.

Still a further aspect of the invention is the provision of a tire having a decorative applique and the process for making the same in which little or no waste is experienced in the manufacturing process.

An additional aspect of the invention is the provision of a tire having a decorative applique and the process for making the same which is given to numerous and various designs, colors, configurations, and the like.

Another aspect of the invention is the provision of a tire having a decorative applique and the process for making the same in which better tire balance from side-to-side and better tire uniformity is obtained than with previously known methods and structures.

Yet a further aspect of the invention is the provision of a tire having a decorative applique and the process for the making the same in which the sidewall construction is uniform, with no interruptions or changes of materials or modulus therein.

The foregoing and other aspects of the invention are achieved by an assembly for applying a decorative applique to the sidewall of a tire, comprising: a substrate; and a decal adhered upon a portion of said substrate; said decal and substrate being adapted for receipt by a tire mold during curing of the tire, said decal having a greater characteristic adherence for said tire than for said substrate after curing.

Other aspects of the invention are achieved by the process of imparting a decorative applique to a tire, comprising the steps of: depositing a coating on selected areas of a substrate to form a decal assembly; placing said decal assembly in a tire mold receiving therein a green tire for curing; closing said mold and thereby bringing said coating of said decal assembly into contacting engagement with said green tire; and maintaining said tire and decal assembly within said closed mold at an elevated temperature and pressure for a period of time sufficient to cure said green tire and thereby adhering said coating to said tire.

DESCRIPTION OF THE DRAWING

For a complete understanding of the objects, techniques and structure of the invention reference should be had to the following detailed description and accompanying drawing wherein.

BEST MODE FOR CARRYING OUT THE INVENTION

Figure 1:
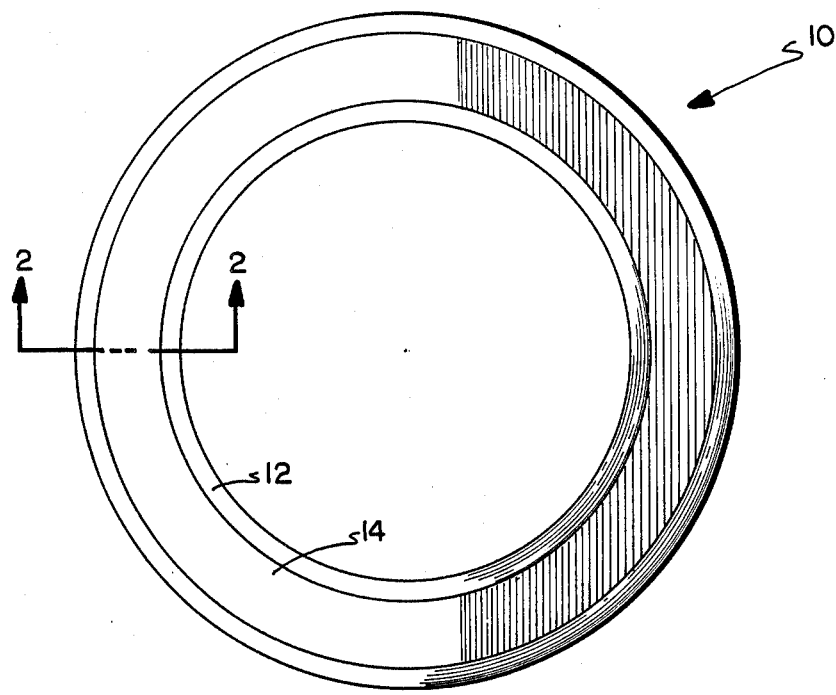
FIG. 1 is a top plan view of the decal assembly of the invention showing a decal ring maintained upon a substrate.

In contrast with the prior art of applying decorative appliques to a tire by means of molding and/or vulcanizing extrudates thereto, the instant invention teaches the application of a decorative applique in the form of a thin decal, such decal being adhered to the tire carcass during the vulcanization process. With reference to FIG. 1, it can be seen that a decal assembly is designated generally by the numeral 10. The decal assembly 10 includes an appropriate substrate 12 having a decal layer 14 maintained thereon. Typically, the substrate 12 will be an annular ring of a width greater than the decal layer 14 received thereby. While the decal layer 14 is shown in FIG. 1 as being a continuous ring to be applied to the tire for generating a "white sidewall" tire, it will be understood that the decal layer 14 may be of any of numerous geometric configurations, including letters and the like. Indeed, the layer 14 may be discontinuous, or may include decorative elements positioned at different radiuses upon the substrate 12.

Figure 3:
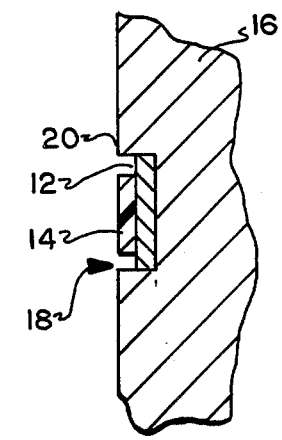
FIG. 3 is a partial sectional view of a tire mold shown receiving the decal assembly of FIG. 1.

As shown in FIG. 3, the decal assembly 10 may be received within a recess or groove 18 within a tire mold 16. The depth of the recess 18 is such that the decal layer 14 extends to be flush with the mold surface 20 such that upon closure of the mold 16 the decal layer 14 makes contacting engagement with the tire sidewall.

Figure 2:
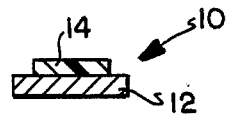
FIG. 2 is a cross sectional view of the decal assembly of FIG. 1 taken along the line 2—2.

As shown in FIGS. 1 and 2, the substrate 12 is preferably formed from any thermally-stable material which will release the decal layer such as acetate or polyester. The substrate 12 may also be formed of paper having an appropriate sealing agent thereon such that the decal layer 14 does not permeate the paper. Once the substrate 12 is formed, a stencil or mask may be used for depositing the decal layer 14 thereon. Typically, the decal layer 14 comprises a polymeric paint which is appropriately deposited upon the substrate in the desired locations by appropriate positioning of the stencil or mask. The polymeric paint may be applied in any of numerous suitable fashions such as brushing, spraying, or screening. Typically, the polymeric paint will be deposited to a thickness of 0.001-0.010 inch. Accordingly, the decorative applique or decal is of a substantially thin nature, lying flush with the sidewall of the tire, and extending therefrom an amount which is barely perceivable by the human eye. Further, its weight is negligible, not affecting the side-to-side balance of the tire.

It has been found that a wide variety of polymeric paints are acceptable for generating the decorative applique. It is presently believed that the paints are best made from a thermoplastic elastomer. It has been found that polymeric paints having a base of styrene butadiene styrene block copolymer (SBS) have a suitable thermoplastic nature and aging characteristics to be employed for forming the decal layer 14. Other suitable polymeric paints are set forth in detail in copending patent application Ser. No. 766,228, filed herewith.

Suffice it to say that a suitable polymeric paint of the above nature is stenciled or screened upon a substrate 12 to form a decorative applique 14 thereon. The resultant decal assembly 10 is placed within a ring-like groove 18 within a tire mold 16 such that the decal layer 14 will make contacting engagement with the tire upon closure of the mold. With a green tire placed in the mold, the bladder is inflated and the mold closed in standard fashion. The polymeric paint decal layer 14 makes contacting engagement with the sidewall of the tire and adheres thereto during the curing process. Initial adherence is enhanced by the tacky nature of the green tire. The heat and pressure incident to tire curing achieves the bonding action of the decal layer 14 to the tire such that when the mold is opened and the tire removed, the affinity or adherence of the decal layer 14 to the tire will be greater than to the substrate 12. Accordingly, the substrate 12 may be simply peeled away. Of course, the backing substrate 12 does not have an affinity or compatibility with the tire and does not adhere thereto.

In typical curing operations, the tire will be maintained in the mold at a temperature of 320°-360° degrees F., and preferably 330°-340° degrees F. The tire will be maintained at this temperature, and under pressure of the bladder in the range of 200-400 psi, for a period of 10-20 minutes, but preferably 12-15 minutes, depending of course upon tire parameters such as thickness, size, composition, and the like.

The bonding of the decal layer 14 to the tire occurs during the curing operation in which the tire and decal are exposed to elevated temperature and pressure. The adherence of the decal layer 14 to the tire is permanent and significantly greater than the adherence to the substrate 12. It will be noted that the substrate 12 is formed of temperature-stable materials such that the substrate 12 maintains its integrity during and after the curing operation. If flexible plastic or sealed paper is used as the substrate 12, the substrate 12 may be allowed to remain upon the tire during storage and shipment, being removed only when the tire is to be mounted upon a vehicle for placement into use. Accordingly, the substrate 12 may serve as a protective layer for the decal layer 14, keeping the decorative appliques clean and safe from harm until the tire is actually placed into use. Obviously, for any of the substrate materials, the surface of the substrate 12 should be uniformly smooth such that the resulting outward surface of the decorative applique will be correspondingly smooth and blemish-free. It has also been found that no special release coating is necessary for any of the recited substrate materials to properly function.

It will be understood that the drawings are not shown to detail, but are presented in illustrative form only. By way of example, the depth of the recess 18 would typically be equal to the aggregate thickness of the decal layer 14 and the substrate 12. The thickness of the substrate 12 will, of course, vary with respect to the material used to form the substrate. Typically, the substrate will have a thickness on the order of 0.002-0.050 inch.

Thus it can be seen that the objects of the invention have been achieved by the structure and technique presented hereinabove. The result is a tire having a decorative sidewall which is sufficiently thin as to leave tire balance substantially unaffected. Further, the decorative appliques may be adhered to a standard black wall tire such that a single standard black wall tire may be constructed with the determination made just prior to the curing process as to whether or not the tire is to remain a black wall or include a decorative applique. Coextrusions, finish buffing, designing of dies, and the adding of protective paints to the finished sidewall are all eliminated. All of this is achieved at considerable savings of time and expense without degradation to tire performance or appearance.

While in accordance with the patent statutes only the best mode and preferred embodiment of the invention has been presented and described in detail, it will be understood that the invention is not limited thereto or thereby. Accordingly, for an appreciation of the true scope and breadth of the invention reference should be had to the following claims.

What is claimed is:

1. The process of imparting a decorative applique to a tire, comprising the steps of:
   depositing and solidifying a coating of a single homogeneous layer of a thermoplastic elastomer on selected areas of a substrate to form a decal assembly, said single homogeneous layer being the only layer on said substrate;

subsequently placing said decal assembly in a tire mold receiving therein a green tire for curing;

closing said mold and thereby bringing said coating of said decal assembly into contacting engagement with said green tire; and maintaining said tire and decal assembly within said closed mold at an elevated temperature and pressure for a period of time sufficient to cure said green tire and thereby adhering said coating to said tire.

2. The process according to claim 1 wherein said coating comprises a paint selectively deposited upon said substrate by masking said substrate.

3. The process according to claim 1 which further includes the step of removing said substrate from said coating after said tire is cured, said coating remaining adhered to said tire.

4. The process according to claim 1 which further includes the step of removing said tire from said mold after curing and maintaining said substrate upon said coating until such time as said tire is put into use.

* * * * *